July 27, 1965

R. M. CONKLIN 3,196,989

SPEED CONTROL DEVICE

Filed Nov. 6, 1961

INVENTOR.
ROBERT M. CONKLIN

BY *Gray, Mase, & Dunson*

ATTORNEYS

United States Patent Office 3,196,989
Patented July 27, 1965

3,196,989
SPEED CONTROL DEVICE
Robert M. Conklin, Muskegon, Mich., assignor, by mesne assignments, to The Battelle Development Corporation, Columbus, Ohio, a corporation of Delaware
Filed Nov. 6, 1961, Ser. No. 150,309
8 Claims. (Cl. 188—134)

This invention relates to a speed control device, and, more particularly, to a construction of a velocity-controlled pneumatic actuator.

Hydraulic actuators offer very little velocity variation with fluctuating loads because they use an incompressible fluid. Where load and velocity requirements are fairly constant, hydraulic actuators are generally accepted in spite of their complexity, increased maintenance, and expense. Attempts have been made to develop velocity-controlled pneumatic actuators, but these attempts have usually been made with complicated hydropneumatic-type units. The fact that such units have widespread use, despite their being clumsy, is an indication of the need for actuators of the velocity-controlled type.

One example of an application for a velocity-controlled pneumatic actuator is in the tool field. Forced feed drills that are used in the aircraft industry, for example in working with such metals as titanium and other work-hardening alloys when actuated by pneumatic forced feed are unsuitable because the drill tends to jump when it emerges from the work causing large burrs. The expensive alternatives of hydropneumatic and mechanical jack screw feed have rather questionable success.

The simple hydraulic or pneumatic actuator using a piston-cylinder motor tends to speed up or jump when the load at the piston rod decreases and to slow down when the load increases. When the pressure of a compressible fluid is the motivating agent, as it is in the pneumatic actuators, the "jumping" result is somewhat reduced by the compression of the fluid. Still, where constant speeds are required, such actuators are unsatisfactory for use with fluctuating loads.

Briefly described, this invention concerns a load-responsive speed control device comprising brake means frictionally engaged with a guide wall and resiliently preloaded to provide a braking effect, and means responsive to changes in the dynamic load for decreasing the braking effect preload when the dynamic load increases and for increasing the braking effect preload when the dynamic load decreases.

One advantage of this invention is that the stroke of the pneumatic actuator herein described is maintained at a constant speed, even though the load upon the device may vary appreciably. Another advantage of the apparatus of this invention is its adaptability to presently existing types of pneumatic actuators. Still another advantage of this invention is the compact construction allowing great improvement with little increase in weight or size. Other features and advantages will be apparent from the drawings, the description, and the claims that follow.

Figures 1, 2, 3:
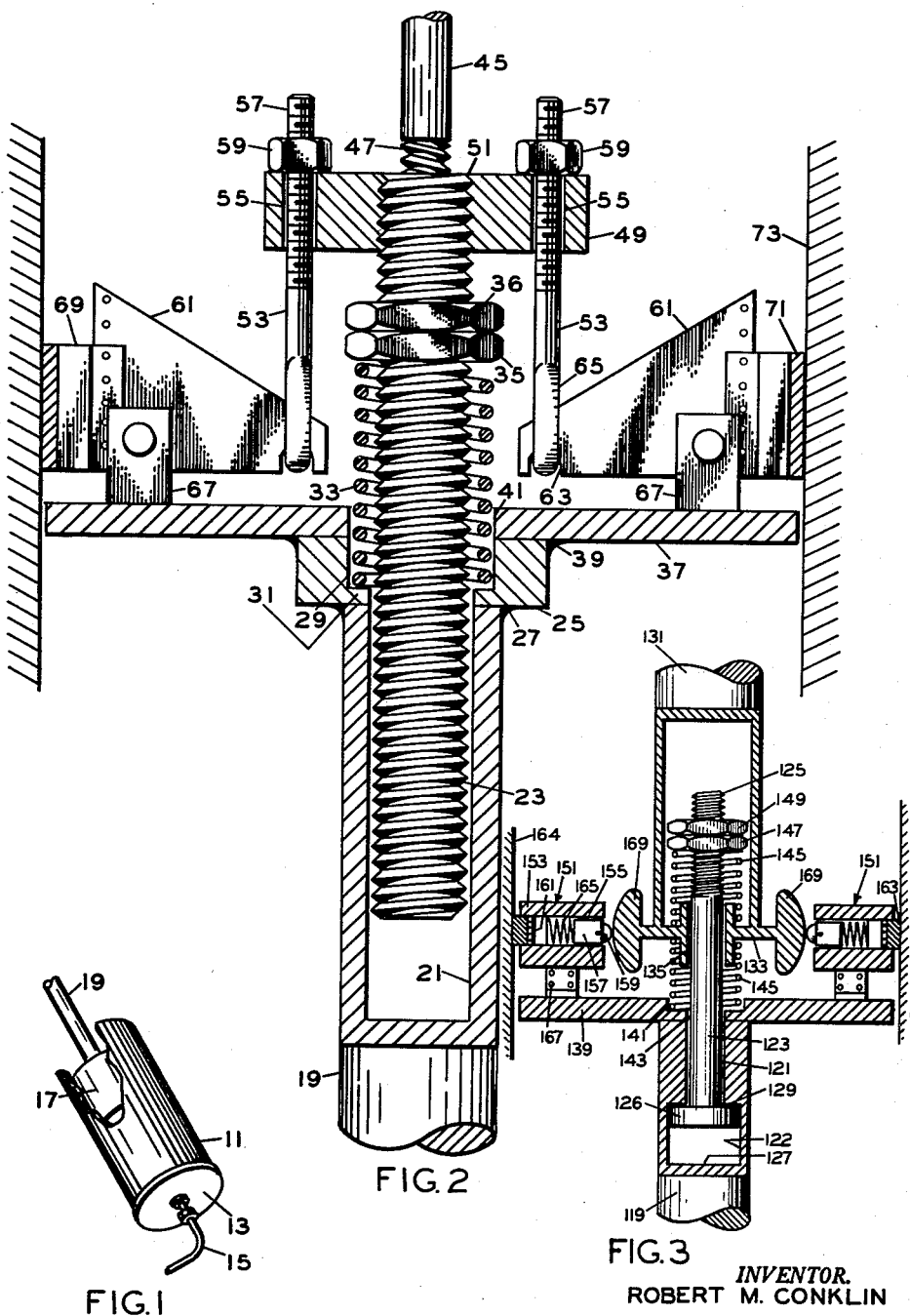
FIG. 1 is a perspective view of a simplified pneumatic actuator.
FIG. 2 is a cross-sectional view of the apparatus of this invention.
FIG. 3 is a cross-sectional view of a second embodiment of this invention.

Referring to FIG. 1, the ordinary pneumatic actuator includes a cylinder 11, closed at one end 13, with means 15 for supplying pressurized air through the end 13. A piston 17 is reciprocally mounted in the cylinder 11 and is responsive to changes of air pressure in the cylinder 11. A piston rod 19 is attached to the piston 17 and in a conventional pneumatic actuator is usually coupled directly to a load. The above description and the drawing referred to depict a simplified version of a pneumatic actuator to which the apparatus of this invention may easily be adapted.

As shown in FIG. 2, the end of the piston rod 19 is hollow, having a cylindrical chamber 21 therein. A load rod, such as a threaded bolt 23, is partially disposed in the cylindrical chamber 21, with the walls of the chamber 21 acting as a guide to maintain the load rod 23 in alignment with the piston rod 19. An annular ring 25 formed at the end of the piston rod 19, or attached by suitable means such as a weld 27, has an opening 29 whose diameter is greater than the diameter of the cylindrical chamber 21 and a shoulder 31 whose inside diameter is substantially equal to the diameter of the cylindrical cavity 21. Resilient means are placed between the bolt 23 and the piston rod 19, and this is shown in FIG. 2 as a spring 33 positioned around the load rod 23 and resting on the annular shoulder 31. The rod 23 could, of course, fit snugly into the cylindrical cavity to form an air spring or cushion providing resilient means between the rod 23 and the piston rod 19. The spring 33 is confined at its upper end by means of an adjustable stop such as nuts 35 and 36. A circular plate 37 is positioned on the annular ring 25 and attached to the annular ring 25 by suitable means, such as a weld 39. The plate 37 has a central opening 41 whose diameter is substantially equal to the diameter of opening 29 in the annular ring 25. The rod 23 and spring 33 also pass through the opening 41 in the plate 37. At the protruding end of the load rod 23 an extension or fitting 45 is attached by a suitable means, such as threads 47 threaded into a threaded hole (not shown), in the rod. The fitting 45 may be constructed for attachment to a tool or load according to the use of the apparatus. Also attached to the protruding end of the rod 23 is a block 49 with a threaded opening 51 to engage the end of the rod 23. Other means of attachment for the block 49, could, of course, be used. Two tie rods such as eye bolts 53—53 pass through openings 55—55 in the block 49 with the openings 55—55 opposite each other on a line running through the center of rod 23. The tie rods 53—53 are parallel to the rod 23 and may be shortened or lengthened at the block 49 by suitable means such as a threaded end 57 and a nut 59. Brake shoe levers 61—61 are pivotally or rockably mounted on the loop 65 of the eye bolt 53 by means of a notch 63 in each brake shoe lever 61. The brake shoe levers 61—61 are also pivotally mounted on blocks 67—67 that are attached to plate 37. Each brake shoe lever 61 supports a brake shoe 69 which in turn supports a brake lining material 71 adjacent to a guide wall 73. The guide wall 73 may be an extension of the cylinder wall 11, or may be especially provided as an additional cylinder, or just two parallel flat plates attached by a simple means to the cylinder wall 11.

A force on the piston will be transmitted to the load on load rod 23 through the spring 33 so that the spring will be compressed as a function of the load put on it. If this dynamic load should decrease, the compressed spring would tend to move the load rod 23 with increased force. The construction of the braking device shown is incorporated to compensate for this condition. When the spring force on the rod 23 is more effective than the load, the resilient connection between the piston rod 19 and the rod 23 tends to force the rod 23 away from the piston rod 19. This force is transmitted to the block 49, through the tie rods 53—53, exerting a force at the notches 63—63 and pivoting the brake shoes 61—61 on their mounting blocks 67—67 (which are attached to the piston rod 19 through plate 37) forcing the brake lining 71—71 against the guide walls 73—73 to provide greater resistance to movement of the rod 23 and also the load rod 23. As the dynamic load increases the spring 33 is of course compressed and the piston rod 19 tends to "catch up" so that more force is exerted at the pivot points on the brake shoe levers 61—61 through the plate 37 at the block 67 and the brake shoes 71—71 pivot away from the guide walls 73—73 causing lower resistance to the movement of the mechanism. In short, any time that the resilient connection 33 tends to increase the distance between the rod 23 and the piston rod 19 (due to decreased load), the braking mechanism (which is connected between the rod 23 and the piston rod 19) applies a resistive force to the guide walls 73—73, and, any time that the resilient connection 33 tends to decrease the distance between the rod 23 and the piston rod 19 (due to increased load), the braking mechanism releases the resistive force against the guide walls 73—73. The resilient means 33 provides a preload on the apparatus so that under "no external load" conditions the brake shoes 71—71 rest against the guide walls 73—73. Thus, the mechanism moves at substantially uniform speed despite changes in load during movement.

FIG. 3 shows an embodiment of the invention that can be used on a double-acting pneumatic actuator. This mechanism applies a braking force at no-load condition and the braking force is released as the load builds up, regardless of the direction that the piston rod is moving.

The piston rod 119 (FIG. 3) is hollow, having a cylindrical chamber 121 therein and an enlarged chamber 122. A rod 123, having a threaded portion 125 at one end and an enlarged portion 126 at the opposite end, is fitted into the piston rod 119 with the body of the rod 123 disposed in the cylindrical chamber 121, and the enlarged portion 126 disposed within the chamber 122. The rod 123 is thus reciprocal in the cylindrical chamber 121 to the extent of the movement allowed between the end 127 and the shoulder 129 of cylindrical chamber 122. A load rod 131 is attached to a circular plate 133 which, in turn, is attached to a sleeve 135 that is disposed around the rod 123. The end of the piston rod 119 is attached to a plate 139, having an annular recess 141 around a hole 142 at its center. A spring 143 is positioned so that one end fits into the annular recess 141 and the opposite end bears against the plate 133. A second spring 145 is positioned around the rod 121, with one end against plate 133 and the opposite end against adjustable stop nuts 147 and 149.

Braking mechanisms 151—151 are mounted on the plate 139 at each side of the load rod 131. Each brake mechanism 151 is comprised of a block 153, having a bore 155, in which is mounted a bearing holder 157 and bearing 159. The bearing holder 157 is slidable in the bore 155. Also mounted within the bore 155 is a brake shoe 161, which supports a braking material 163. A spring 165 is disposed between the bearing holder 157 and brake shoe 161. Block 153 is mounted on plate 139 by a support 167 and is adjustable in the direction of the movement of the piston rod. Plate 133 supports a pair of cams 169—169.

When the piston rod 119 of the pneumatic actuator pushes against a load on load rod 131, spring 143 is compressed so that the brake mechanisms 151—151 advance slightly faster than the load rod 131. Bearing 159 thus moves along cam 169 and releases some of the compressive force on spring 165, so that the brake material 163 is not pressed quite as tightly against surface 164. As the load increases, the force of the spring 165 against brake shoe 161 is released, since the bearing 159 moves further along the surface of cam 169. If the load were suddenly to decrease, spring 143 would force load rod 131 back toward the position shown in FIG. 3, so that the force on the brake material 163 would be increased.

When the piston rod 119 travels in the opposite direction, pulling a load attached to the load rod 131, spring 145 is compressed, and the load rod 131 moves away from plate 139. Again, the action of cam 169, bearing 159, and spring 165 relieves the pressure of the brake material 163 against the wall 164. As the load or drag on the load rod 131 increases, less braking force is applied, and, on a sudden decrease of drag, spring 145 returns the load rod toward the position shown in FIG. 3, and increases the braking force. Thus, regardless of which direction piston rod 119 travels, a braking force is available to prevent rapid acceleration or deceleration of the piston rod due to fluctuations of load on the pneumatic actuator.

In general, this invention can be expected to produce its advantages when the input to the piston rod 19 or 119 is driven with a substantially constant force. In the specific case of application with an air cylinder, the air supply must therefore be at substantially constant pressure and constant volume. Therefore, when either of the embodiments of FIG. 2 or 3 are associated with piston rod 19 in FIG. 1, a flow control valve will ordinarily be provided in the air inlet to the cylinder.

It will be further understood of course, that, while the form of the invention herein shown and described, constitutes a preferred embodiment, it is not intended to illustrate all possible forms or ramifications of the invention. It will also be understood that the words used are words of description rather than words of limitation and that various changes, such as changes in shape, size, and arrangement of parts may be made without departing from the spirit and scope of the invention herein disclosed.

What is claimed is:

1. In a pneumatic actuator including a piston rod attached to a piston with said piston slidably mounted in a cylinder, a load-responsive apparatus comprising: a load rod; resilient means between said load rod and the piston rod; at least one guide wall; at least one brake shoe, supporting a frictional material, pivotally mounted between the load rod and the piston rod and positioned to pivot against the guide wall on increase of the distance between the load rod and the piston rod and to pivot away from the guide walls on decrease of the distance between the load rod and the piston rod.

2. In a pneumatic actuator including a piston rod attached to a piston with said piston slidably mounted in a cylinder, a load-responsive apparatus comprising: a load rod; resilient means between said load rod and said piston rod; at least one guide wall substantially parallel to said piston rod; and brake shoes, connected between said load rod and said piston rod, mounted to pivot against said at least one guide wall when the distance between said load rod extension and piston rod increases and to pivot away from said at least one guide wall when the distance between said load rod and said piston rod decreases.

3. In a pneumatic actuator including a piston rod attached to a piston with said piston slidably mounted in a cylinder, a load-responsive apparatus comprising: a load rod; resilient means between said load rod and said piston rod; at least one guide wall substantially parallel to said piston rod; at least one brake shoe, pivotally attached to said load rod and to said piston rod at different points, having a surface with frictional material thereon adjacent to said at least one guide wall, said surface being moved away from said guide wall on compression of said resilient means and pressed against said guide wall on expansion of said resilient means.

4. In a pneumatic actuator including a piston rod attached to a piston with said piston slidably mounted in a cylinder, a load-responsive apparatus, comprising: a threaded rod having one end disposed in a cavity of said piston rod and the other end protruding therefrom; a spring positioned around said threaded rod confined between an annular shoulder disposed around end of said piston rod cavity and a stop attached to said threaded rod; an annular plate attached to the end of said piston rod; a block attached to the protruding end of said threaded rod; at least one pair of brake shoe lever disposed opposite one another on each side of said threaded rod, pivotally mounted on said plate, and pivotally attached to said block; a brake shoe attached to said brake shoe lever supporting a brake material adjacent to fixedly mounted guide walls so that the pivoting of said brake lever forces said brake material against said guide walls.

5. A load-responsive speed control for pneumatic actuators, including a piston rod attached to a piston with said piston slidably mounted in a cylinder, comprising: load engaging means resiliently positioned at a selected distance from said piston rod; cam means attached to said load engaging means; braking means attached to said piston rod and engaging said cam means, said braking means positioned with respect to said cam means to apply a maximum braking force at said selected distance between said load engaging means and said piston rod and to decrease said braking force when said selected distance is varied by a load fluctuation causing a change in the positional relationship between said braking means and said cam means.

6. In a pneumatic actuator, including a piston rod attached to a piston with said piston slidably mounted in a cylinder, a load-responsive apparatus, comprising: a retaining rod partially disposed in a first cavity of said piston rod, said retaining rod having an enlarged end confined in a second cavity of said piston rod and said retaining rod having a threaded end protruding from said first cavity; a load rod having load engaging means at one end and reciprocally mounted on said retaining rod at a position removed from said threaded end; cams attached to said load rod; a first spring positioned between said load rod and a stop attached to said threaded end of said retaining rod; a second spring positioned between said load rod and said piston rod; at least one pair of blocks having a central bore, said blocks attached to a mounting plate, said mounting plate attached to the end of said piston rod; a cam follower slidably mounted in one end of the central bore of each of said blocks, said cam follower positioned to engage one of said cams; a brake material holder slidably mounted at the opposite end of said central bore positioned to place a brake material against fixedly mounted guide walls; resilient means in said central bore between said cam follower and said brake material holder for facing said brake material against said guide wall, with the greatest force exerted when said first and second springs are equally compressed.

7. In a pneumatic actuator including a piston rod attached to a piston with said piston slidably mounted in a cylinder, a stroke speed control, comprising: resilient means between a load rod and a piston rod; braking means including at least one brakeshoe positioned against the wall of the actuator cylinder, said at least one brakeshoe connected to the piston rod; and means connected to the load rod and braking means for sensing the distance between the load rod and the piston rod for moving said brakeshoe away from the wall of the actuator cylinder when the distance between the load rod and piston rod changes.

8. In a pneumatic actuator including a piston rod attached to a piston slidably mounted in a cylinder, a load-responsive apparatus, comprising: a load rod; resilient means between the load rod and the piston rod, said resilient means allowing the distance between said load rod and said piston rod to vary; at least one guide wall; braking means connected to said piston rod and being preloaded to act against said at least one guide wall to apply a braking force; and adjustment means connected to said load rod and engaging said braking means, said adjustment means responsive to changes in the distance between said load rod and said piston rod for changing the braking force.

References Cited by the Examiner
UNITED STATES PATENTS

| 1,473,718 | 11/23 | Barnette | 188—168 X |
| 2,297,589 | 9/42 | Tackett | 188—168 |
| 2,338,069 | 12/43 | Horton et al. | 121—40 |
| 2,676,571 | 4/54 | Parsons | 121—40 |
| 2,979,034 | 4/61 | Geyer | 121—40 |

EUGENE G. BOTZ, *Primary Examiner.*

RALPH BRAUNER, DUANE R. REGER, *Examiners.*

Dedication 3,196,989.—*Robert M. Conklin*, Muskegon, Mich. SPEED CONTROL DEVICE. Patent dated July 27, 1965. Dedication filed Aug. 2, 1974, by the assignee, *The Battelle Development Corporation.*

Hereby dedicates to the People of the United States the entire remaining term of said patent.

[*Official Gazette March 11, 1975.*]